P. A. & W. V. REID & J. KELLEY.
WIRE FENCE MACHINE.
APPLICATION FILED MAY 29, 1905.
1,160,089.
Patented Nov. 9, 1915.
6 SHEETS—SHEET 5.
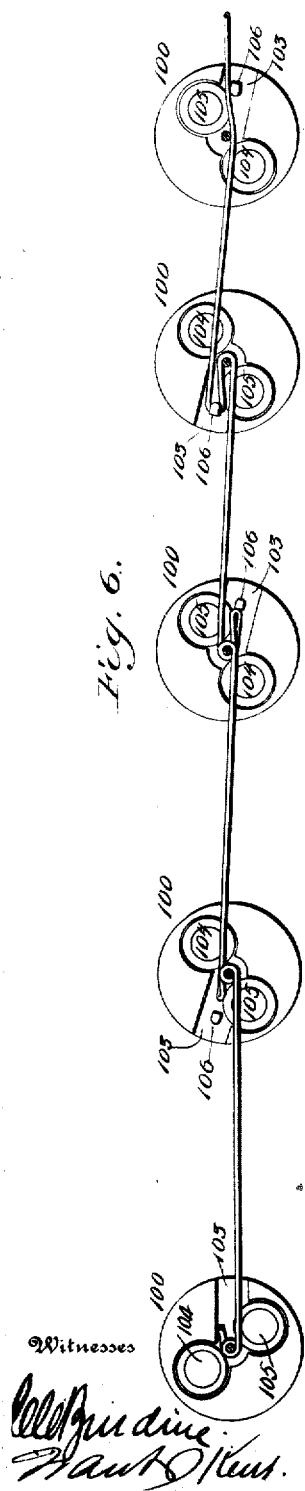
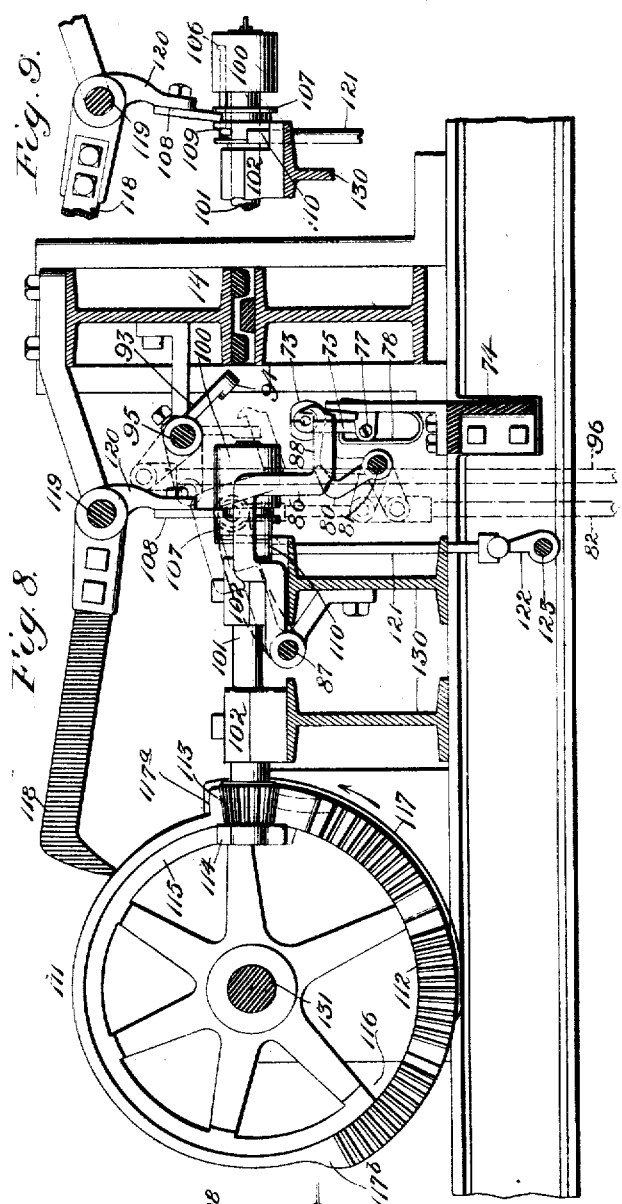
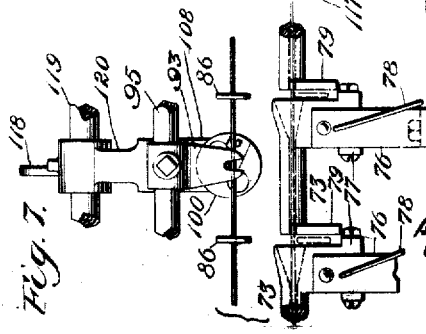

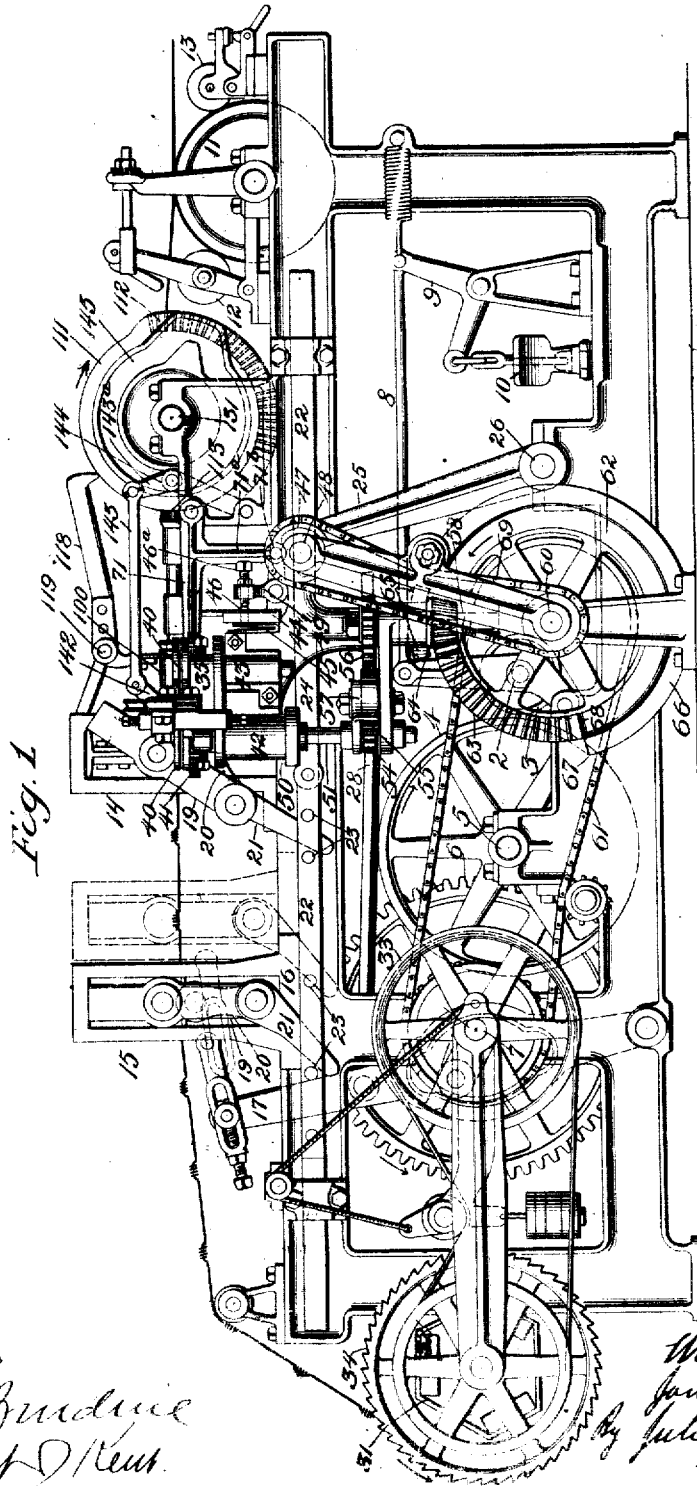

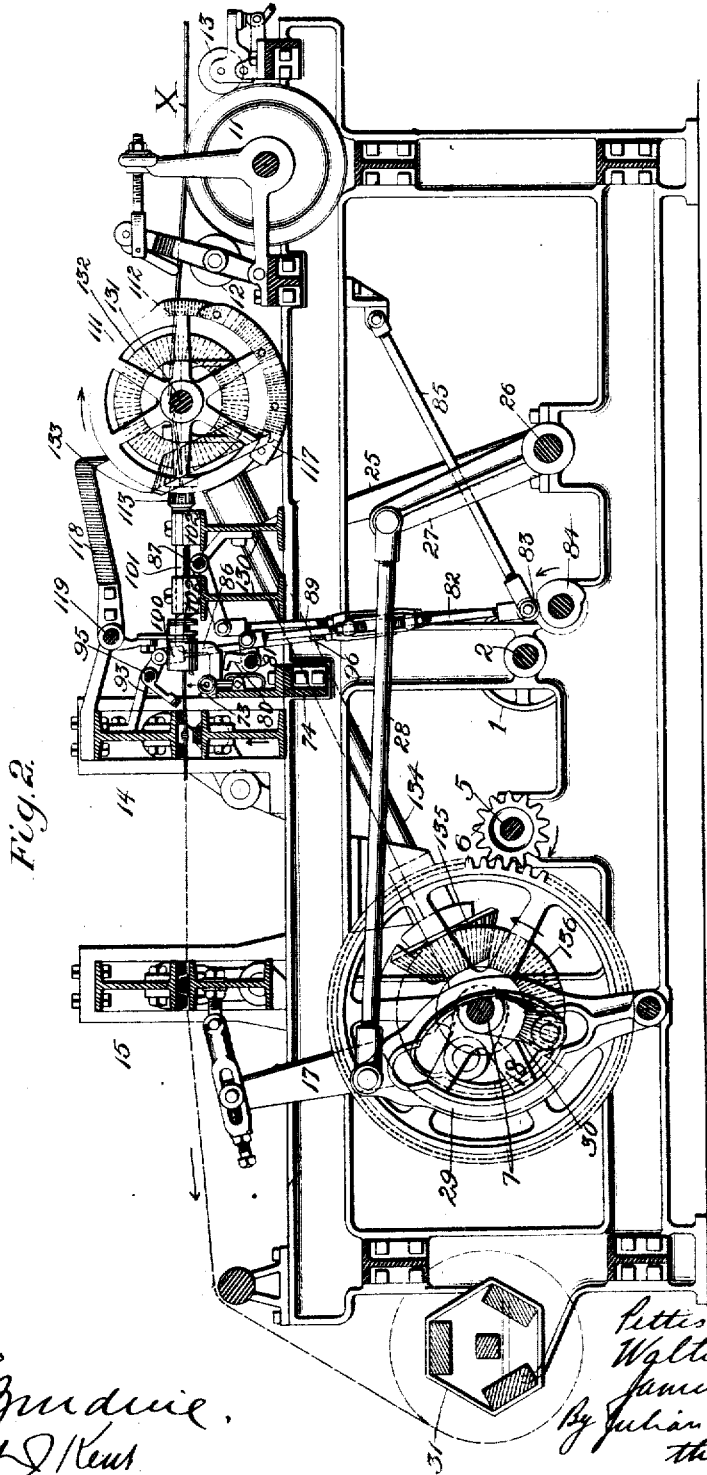

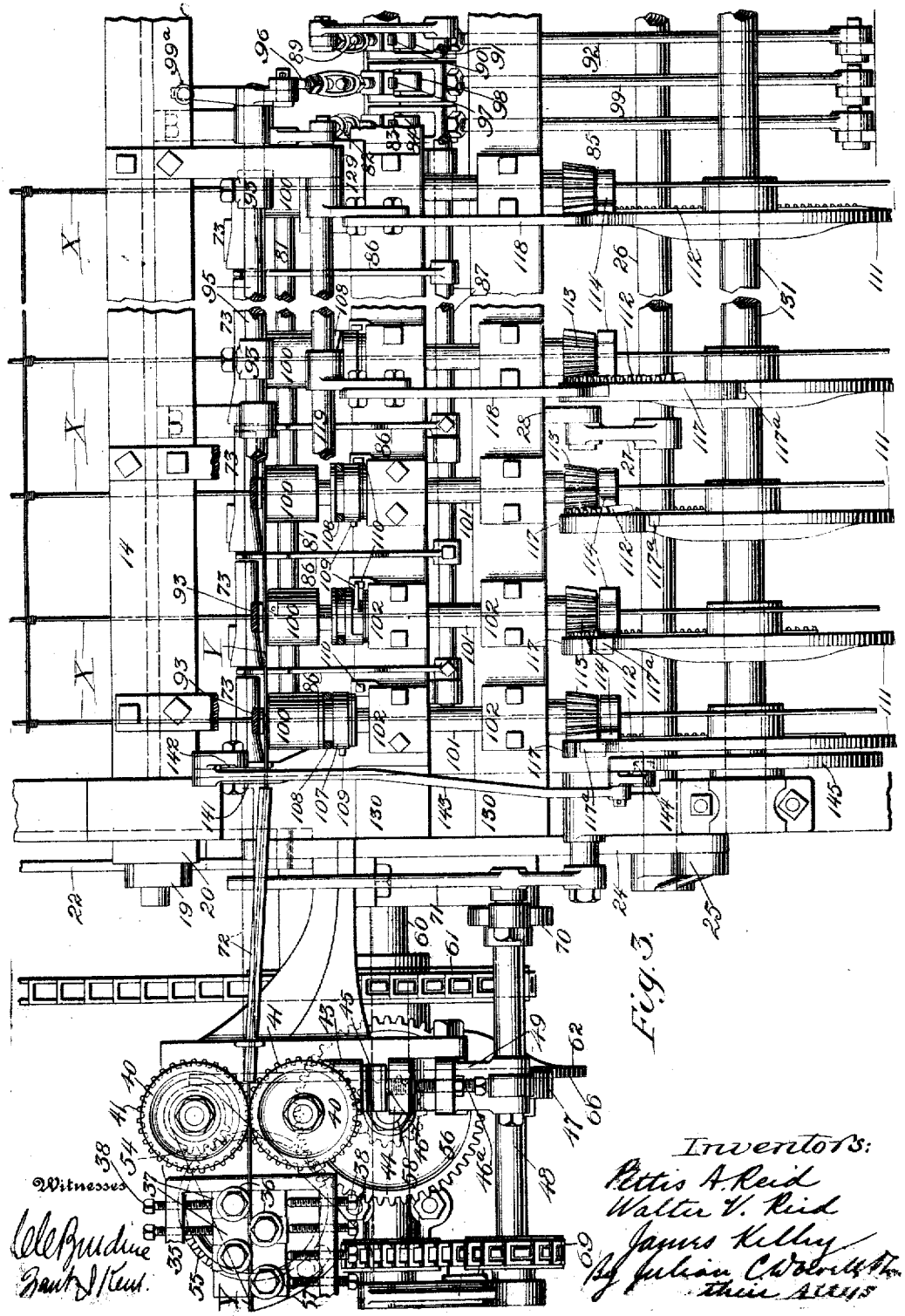

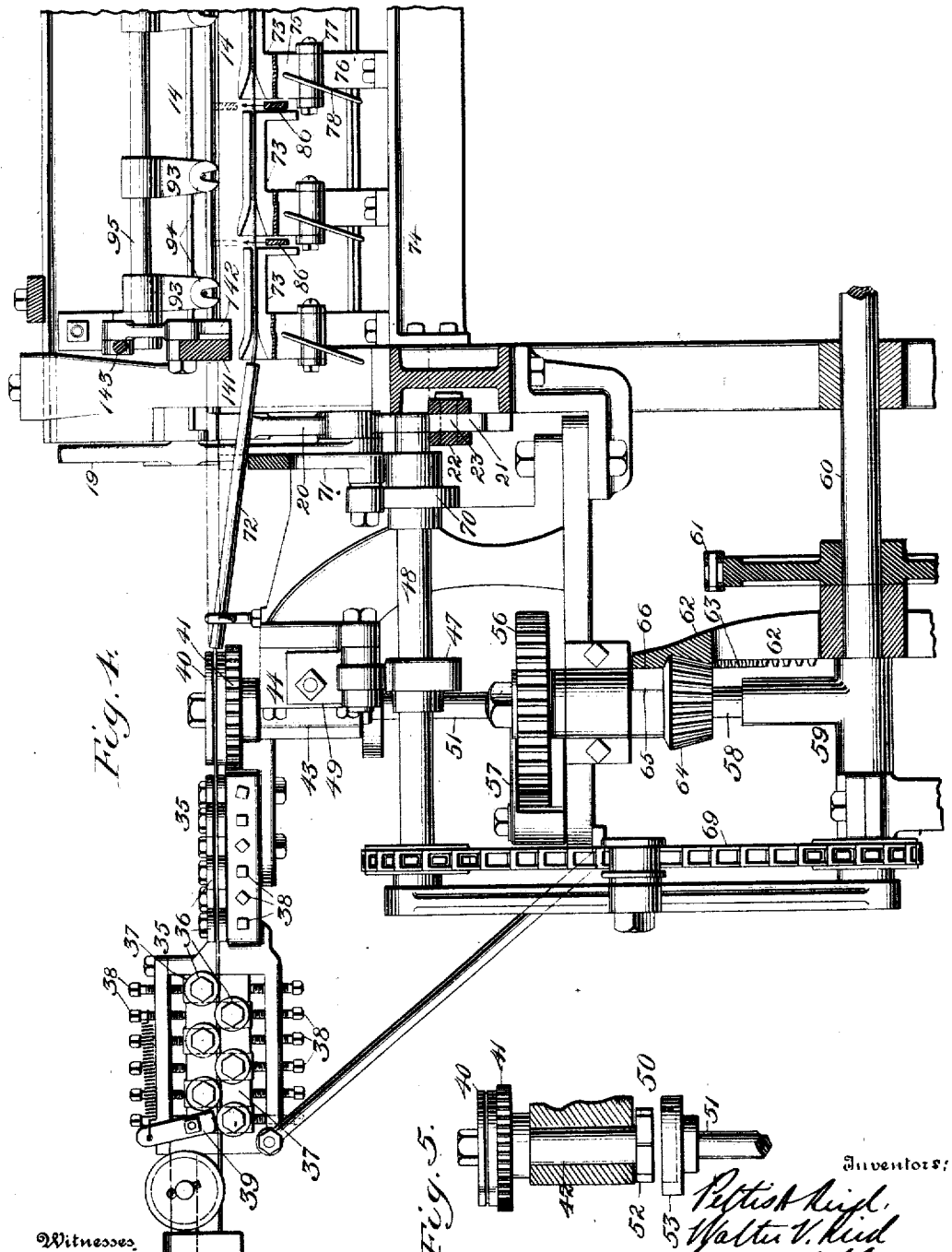

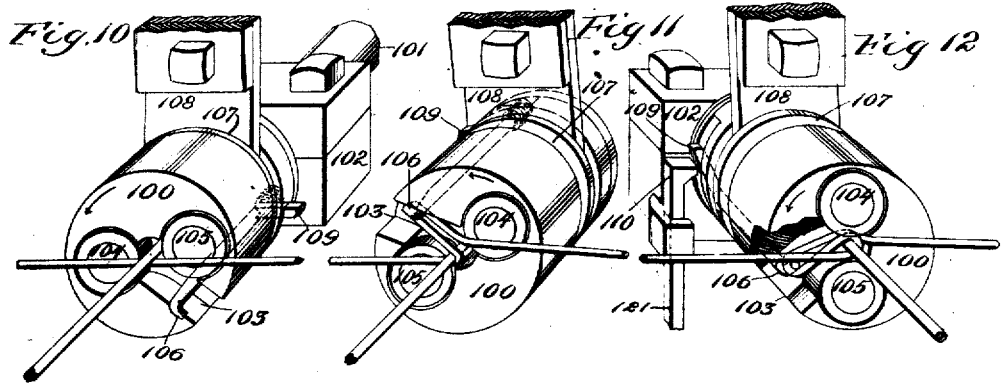
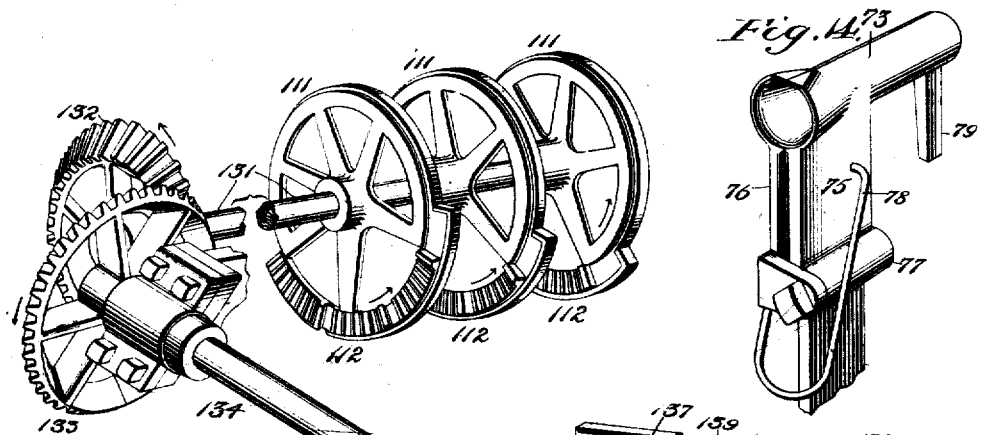
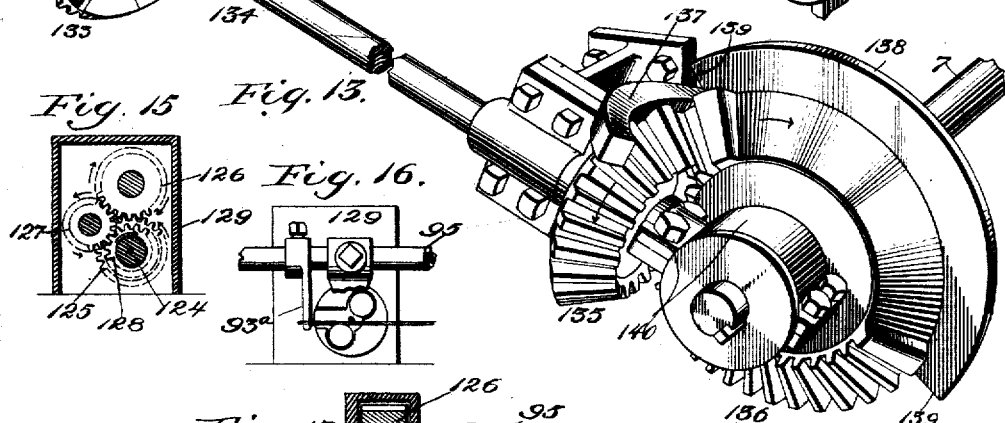

UNITED STATES PATENT OFFICE.

PETTIS A. REID, WALTER V. REID, AND JAMES KELLEY, OF RICHMOND, INDIANA; SAID WALTER V. REID AND JAMES KELLEY ASSIGNORS TO SAID PETTIS A. REID.

WIRE-FENCE MACHINE.

1,160,089.

Specification of Letters Patent.  Patented Nov. 9, 1915.

Application filed May 29, 1905. Serial No. 262,966.

*To all whom it may concern:*

Be it known that we, PETTIS A. REID, WALTER V. REID, and JAMES KELLEY, citizens of the United States, residing at Richmond, in the county of Wayne and State of Indiana, have invented certain new and useful Improvements in Wire-Fence Machines; and we do hereby declare the following to be a full, clear, and exact description of the invention, such as will enable others skilled in the art to which it appertains to make and use the same.

This invention relates to wire working machinery, particularly to machines for making wire-fabric or fencing comprising longitudinal strands, runners or line wires, and stays or cross-wires attached thereto at intervals.

In this specification the parallel runners or line-wires will be referred to as the "strands," and the cross-wires as the "stays." The expression "stay-feed-wire" will be employed to denote the feed-wire from which the stays are successively formed and severed.

United States Patent No. 721605, of February 24, 1903, to P. A. Reid, J. Kelley and W. V. Reid (the inventors of the present machine), covers a fabric-making or wire fence machine in which the strands, having been threaded through the machine, are fed or drawn under tension step by step or intermittently, while the stays are attached during the intervals of pause, by coiling, twisting or wrapping around the strands the extremities and intermediate loops of the stays placed across said strands; the stays, comprising wire sections formed with projecting loops at intervals corresponding to the number and spaces of the strands, having been previously formed by independent means, and being introduced at proper periods to the fence machine.

Machines for forming the stays are illustrated and described in U. S. Patents of February 24, 1903, Nos. 721567 and 721568, to J. Kelley and P. A. Reid, and to J. Kelley, W. V. and P. A. Reid, respectively; the principle of both machines being to hold or support a wire at different portions of its length, and to bend or fold intervening portions into loops as the clamps, holders or supports are brought together, which may be either concurrently, as in Patent No. 721567, or successively, as in Patent No. 721568.

The present invention accomplishes the important object of performing in one automatic machine the operation of making the stays and applying them to the strands; the formation of the stays being concurrent with the attachment thereof.

In carrying out the invention, a series of parallel strands, spaced at desired distances, are drawn intermittently through the machine under tension, as in the machine of Patent No. 721605, while a stay-feed-wire is also fed intermittently across the strands, to provide the wire for the stays, which are successively formed and applied to the strands and cut off or severed from the main length of said feed-wire. The strands pass through a series of coilers or twisters, which operate during the interim of pause of the strands, and work in slight progression. The first twister, which is the one most remote from the feed-mechanism for the stay-feed-wire, bends, coils or wraps the extremity of said feed-wire around the outermost strand of the series; and in regular progressive order the other twisters pull or draw loops in the body of said feed-wire, and coil, twist, wind or wrap said loops around the strands; thus forming and attaching the stay, which is severed from the feed-wire by the cutter. The purpose of the progressive action of the series of twisters is to allow each twister to draw a sufficient length of the feed-wire to form a loop before the action of the next twister begins so as to avoid breakage of the feed-wire by the simultaneous drawing or formation of a number of loops in a given length.

The invention embraces novel and exceedingly effective mechanism for performing the functions stated, including improved coilers or twisters, operating and timing mechanism, and mechanism for guiding and positing the stay-feed-wire in the operation for forming and attaching the stays; improved feed-mechanism for the stay-feed-wire; mechanism for straightening the stay-feed-wire as it comes from its reel or spool, and before it passes to the machine; various improvements throughout the fence-machine, adapting the same to the performance of its greater work; and the coöperative organization of the several novel mechanisms and features in an improved automatic fence machine of increased efficiency and rapidity of operation, saving time, labor, power and machinery in the manufacture of wire fencing or fabric of the character noted.

The accompanying drawings, which form a part of this specification, illustrate a practical embodiment of the invention in a machine of the same general character as that shown and described in the aforesaid Patent No. 721605, in which patented machine the strands pass from their spools through a series of tension devices, thence are threaded through the twisters or coilers, thence between stationary jaws which grip and hold the strands taut while at rest, and between reciprocating jaws which intermittently grip and draw back the series of strands, and finally to the reel which winds the finished fabric. It will be understood, however, that the invention is not limited to this or any specific embodiment, but is susceptible of incorporation in different machines, and is independent of the particular mechanisms employed for tensioning, guiding and feeding the wires; while the novel mechanisms constituting the invention are also susceptible of various modifications in details of construction, arrangement and coördination of parts, particularly in respect to the gearing and mechanical contrivances employed for actuating said mechanisms; so that the following description will be considered with reference more especially to the illustrated machine, and the invention will then be particularly pointed out and defined in the annexed claims.

In said drawings: Figure 1 is a side elevation of a machine embodying our invention. The reciprocating clutch-jaws are shown at their extreme rearward position, at the completion of one intermittent feed movement. The forward position of said jaws, preliminary to gripping the wires for the next feed, is indicated by dotted lines. Fig. 2 is a longitudinal vertical section of the machine, in the same phase of operation as in Fig. 1. Fig. 3 is an enlarged fragmentary top plan view, including the feed-mechanism for the stay-feed-wire and parts of the stay-feed-wire guiding and positing mechanism and the stay-forming and attaching mechanism. Fig. 4 is an enlarged fragmentary view, including a front elevation of the stay-feed-wire feed-mechanism and a vertical cross-section of a part of the machine through the guiding and positing mechanism. Fig. 5 is a detail view of a ratchet or clutch mechanism included in the feed-mechanism for the stay-feed-wire. Fig. 6 is a diagrammatic view, showing the heads or faces of a series of coilers or twisters in progressive operation upon the stay-feed-wire, to form the stay and attach it to the strands threaded through said twisters. Fig. 7 is a detail view showing a fragment of the guiding and positing mechanism for the stay-feed-wire, in front elevation. Fig. 8 is an enlarged fragmentary view, in longitudinal vertical section through the stay-applying mechanism and the stationary jaws; showing in side elevation the stay-feed-wire guiding and positing devices and the stay forming and attaching mechanism for one strand. The guiding and positing devices appear in full lines, in the positions assumed while the stay-feed-wire is being fed across the series of strands; and the dotted lines represent their movements in transferring the stay-feed-wire from the guides and placing it against or adjacent to the strands in proper position for engagement by the twisters. Fig. 9 is a detail side view of the twister and lever for operating the slip-collar connected to the looping tool, showing the latter retracted. Figs. 10, 11 and 12 are three perspective views of a twister, in different phases of the operation of forming and attaching a stay. Fig. 13 is a perspective view of the actuating mechanism for the stay-applying mechanism. Fig. 14 is a detail perspective view of one of the devices for guiding the stay-feed-wire. Figs. 15, 16, and 17 are detail views of mechanism employed for revolving the first twister in a reverse direction to the other twisters of the series.

The illustrated machine being of substantially the same general character as that set forth in our aforesaid Patent No. 721605, a brief explanation of its general construction and operation will suffice, preliminary to a specific description of our present invention. Reference is now made particularly to Figs. 1 and 2.

Power is applied at pulley 1 (Fig. 2) on the power shaft 2, which is movable and has a friction-gear or drum 3 (Fig. 1) adapted to engage a friction-gear or drum 4 on a counter-shaft 5. Said counter-shaft 5 is geared by spurs or gear-wheels 6 to another counter-shaft 7, which latter is the main driving-shaft from which power is transmitted to the various mechanisms and operative members of the machine. The intermediate shaft 5 is employed to reduce the speed from the power shaft, and take the initial strain when the power is applied, though if preferred the main shaft 7 may be driven directly from the power shaft 2.

In order to instantly start and stop the machine at any stage of operation, for adjustment or other purposes, the friction-drum 3 is movable to and from the friction-drum 4; the shaft 2 having a movable bearing connected by a rod 8 to a retracting spring, which tends to hold the friction-drum 3 away from the co-acting friction-drum 4; and said rod 8 being connected by a bell-crank lever 9 to a treadle or foot-lever 10, which the operator depresses to bring the friction-gears or drums into operative or driving contact.

The strands X, coming from coils or bundles on suitable spools, reels or the like, are threaded through the machine, first passing over, under or around a series of uniformly rotative guide-rollers 11, engaged by pressure appliances, as 12 and 13, the rollers having graduated circumferential grooves to receive and hold the wires with their longitudinal centers equidistant from the axis of rotation, so as to insure uniform advance of all the strands as they are drawn through the machine against the resistance afforded by this tension mechanism. The guiding and tensioning mechanism shown is similar to that described and claimed in the patent to James Kelley, one of the present inventors, No. 836,977, dated November 27, 1906, for a wire tensioning device, the same being an improvement upon the guiding and tensioning mechanism of the fence-machine covered by our Patent No. 721,605. According to this improvement, the several strands or line wires encircle their respective rollers, and their ongoing portions are forcibly pressed against the rollers or in the grooves thereof by the pressure appliances 12. This causes the strands to adhere positively around nearly the whole circumferences of the rollers, prevents slipping, and holds the wires under high tension against the devices which draw them through the machine. The wires are thus advanced in absolutely equal lengths as well as under uniform tension, the advance being according to the rotation of the rollers, which are all keyed on the same shaft to turn together. The pressure appliances 12 comprise rollers held in suitable frames or levers adapted to be locked in position to bear the wires against the guide rollers with great pressure, and to be unlocked for releasing them when desired; an effective construction being fully described in the specification of said Patent No. 721,605, and also in the specification of said Patent No. 836,977. The pressure appliances 13 are auxiliary devices, bearing the off-going portions of the wires upon the guide rollers, just before leaving said guide-rollers, so as to hold the strands in their grooves at all times, whether the appliances 12 are applied or not, as explained in the specification of the said Kelley Patent No. 836,977.

From the guiding and tension mechanism, the strands are threaded through the coilers or twisters (described hereinafter); thence between the stationary jaws 14 and the traveling reciprocating jaws 15. The reciprocating jaws 15 intermittently grip and pull or draw rearward the series of strands, thus feeding them step-by-step. The stationary jaws grip and hold the wires taut during the operation of applying the stay, while the reciprocating jaws are moving forward to obtain a new grip upon the wires. Thus the strands are always gripped and held taut either by the stationary or traveling jaws, one set of said jaws always clutching substantially simultaneously with or an instant before the release of the wires by the other set of jaws, so as to stretch the fence or fabric at all times independently of the action of the reel, and every strand of the series with equal tension. From the reciprocating jaws, the finished fabric passes to the winding reel. As in our former patented machine, the co-acting or opposed faces of the jaws are preferably provided with co-acting ribs and grooves to crimp the strands.

The traveling jaws 15 are mounted on a suitable carriage, such as the slides 16, and are actuated or reciprocated by the rockers 17. Said rockers are connected to the jaws or to the jaw-carriage, and they are operated by the cranks 18 on the shaft 7, said cranks having rollers which travel in internal cams in the rockers and move them to and fro at the proper periods. This is shown in Figs. 1 and 2, principally by dotted lines. The throw of the rockers 17 determines the travel of the jaws, and consequently determines the distance of each intermittent feed of the strands and the intervals between the stays.

The stationary jaws 14 are preferably arranged to grip and crimp the strands either coincidently with the connections of the stays, or midway between adjacent stays; while the traveling jaws are preferably arranged to grip and crimp at the stays; each rearward travel of said jaws being the distance from one stay to the next. The crimps in the strands are thus formed coincidently with the connections of the stays, providing seats for such connections and preventing slipping of the stays on the strands; or the crimps may be formed both at and between the stays, according to the extent of travel of the reciprocating jaws, as explained in the specification of said Patent No. 721,605. The intermediate crimps may be desired for imparting additional elasticity to the fabric, as well as for rendering the fence more visible.

For operating the jaws 14 and 15 to grip and release the wires, one jaw of each pair (preferably the upper one) is fixed, while the other or lower jaw is vertically movable in its side-frames. The upper jaws are shown pivotally-connected by links 19 with cranks 20 on the lower jaws. The arrangement is such that when the links stand vertical, or in alinement with the cranks, the jaws are closed; while any disturbance of this arrangement of the dead centers, by moving the cranks to an inclined position, will allow the lower jaws to drop by gravity; thus separating the jaws to release the wires.

For operating the cranks, they are provided with lever-arms or extensions 21, which are actuated by the reciprocating frames 22 at the sides of the machine; said frames having suitably disposed pins 23 or other means to engage and move said lever-arms 21 at the proper periods. See Figs. 1, 2, 3 and 4. The frames 22 (of which there are two, one at each side of the machine) are reciprocated at the proper periods by link-connections 24 with the rocker-arms 25 on a rock-shaft 26; said rock-shaft having a rocker-arm 27 connected by a link or rod 28 to a rocker 29. The rocker 29 is actuated by a roller carried by a crank 30 on the driving shaft 7, said roller engaging an internal cam in said rocker. When the reciprocating jaws reach the limit of their rearward travel, the frames 22 move forward, and the pins 23 actuate the cranks of the reciprocating jaws to release the wires. Simultaneously therewith or an instant previously, they actuate the cranks of the stationary jaws to grip the wires. The reciprocating jaws then move forward to obtain a new grip upon the wires. When at the limit of their forward travel, the frames 22 move backward, and the pins 23 then actuate the cranks of the reciprocating jaws to grip the wires, while they actuate the cranks of the stationary jaws to release the same. Thus the wire is always gripped and held taut between one set of jaws and the tensioning devices, as before stated.

From the reciprocating jaws, the fabric passes to the winding reel 31, which is driven to automatically wind the fabric as the same is intermittently drawn out by the traveling jaws by means of a slack belt passing around the pulleys 32 and 33, suitable tension being imparted to this belt by a weighted roller or otherwise. The reel, having taken up the slack of the fabric, is held against further winding rotation by the slipping of the belt on the momentarily idle reel pulley 32, unwinding movement of the reel being at all times prevented by means of the pawl-engaged ratchet 34. The reel can be removed from the machine and knocked down for removal of the finished fabric thereon, as described in the specification of said Patent No. 721605.

The machine thus far described is substantially similar to that of our aforesaid Patent No. 721605, so that further description is deemed unnecessary; the foregoing being sufficient to impart a clear understanding of the general construction and operation.

We shall now proceed with a description of the novel mechanism, devices, features, and combinations thereof constituting our present invention considering in order the following: (1) the stay-feed-wire straightener; (2) the feed mechanism for the stay-feed-wire; (3) the devices for guiding the stay-feed-wire across the strands; (4) the positing mechanism or devices for transferring the stay-feed-wire from the guides and placing it adjacent to the strands in proper position for formation and attachment of the stay by the twisters (5) the twisters or the stay forming and attaching mechanism; (6) the actuating mechanism therefor; and (7) the cutter.

The stay-feed-wire Y, coming from a bundle or coil on a suitable spool, reel or the like, is preferably passed through some appropriate straightening mechanism to take out all coil, spiral, bend or unevenness, and to enable the feed-mechanism to feed a straight length of wire across the strands for utilization as a stay. Effective mechanism for this purpose is illustrated in Figs. 3 and 4. Here are shown two straightening devices 35, each comprising a frame having a series of grooved rollers 36 arranged in opposed rows to receive the stay-feed-wire between them; the rollers of one row alternating with those of the other row, and bearing oppositely upon the wire, which is thus compelled to take a slightly zigzag course through the straightener. The rollers 36 are mounted on blocks 37 which are adjustable in the frames by means of set-screws 38 bearing upon the opposite ends of said blocks. One of said straighteners has its rollers arranged in a vertical plane, while the other has its rollers arranged in a horizontal plane, so that the wire is operated upon at all sides and thus effectually straightened.

In order to avoid any reverse movement of the stay-feed-wire, on account of the resistance of the coil from which it is unwound or for other causes, a spring-actuated dog or detent 39 is shown pivoted at the intake end of the first straightener 35; the lower serrated end of said detent bearing upon the wire in such manner as to allow free infeed thereof, but preventing any outward movement.

From the straighteners, the stay-feed-wire passes between coacting grooved feed-rollers 40, which intermittently feed said wire across the strands. See Figs. 1, 3 and 4. Said rollers are rotated in opposite directions by the intermeshing gears 41 on their spindles. The stay-feed-wire is preferably fed under the strands, for greater compactness and superior arrangement and operation of the guiding, positing and stay-applying mechanism, as will hereinafter appear. This is not essential however; said wire may be fed either over or under the strands. The period of feed occurs preferably during the feed of the strands, for utilizing time to best advantage.

It is desirable for the feed rollers to forcibly grip the wire at all times; but to grip with heavy pressure during the periods of feed, so as to insure positive and full feed and prevent slipping: and to grip with less force during the intervals between feeds, so as to allow the wire to be more easily pulled inward by the twisters, each of which in forming a loop pulls in an additional portion of the wire approximately equal to the length contained in a loop. To this end, one of the roller-shafts is journaled in a fixed bearing 42, while the other has a movable bearing 43. Acting between the bearing-box 43 and an abutment 44 is a stout spring 45, which always holds the feed-rollers together with force, yet with sufficient yield to allow the wire to be pulled more easily inward by the pulling or drawing action of the coilers. A movable pin 46 passes through the part 44, bearing against the spring 45. At the periods of feed, a cam 47 on shaft 48 actuates the lever or bell-crank 49 to force the pin 46 inward and further compress the spring 45; thus causing the rollers to grip the stay-feed-wire with great force for the feeding operation. The upper arm of the bell-crank lever 49 is shown having an adjusting screw 46ª in line with and bearing against the end of pin 46, the latter passing loosely through the member 44.

The roller shaft in bearing 42 is preferably connected by any suitable clutch or ratchet device 50 with the driving spindle 51; the purpose of the clutch or ratchet being to allow rotation of the rollers only in the direction of feeding inward the wire. In Fig. 5, number 52 denotes an inner clutch-ring on the roller-shaft; 53 an outer clutch ring on the driving spindle; the one ring being seated within the other, and suitable devices being interposed to rotate the roller-shaft with the driving spindle, and yet allow independent turning of the rollers in the same direction, but preventing any reverse rotation. Spindle 51 is driven from shaft 58 by suitable gears, as 54, 55, 56, the intermediate one 55 being mounted on an adjustable bearing 57 to allow substitution of different-sized spurs for changing the relative speed of the feed-rollers. See Figs. 1 and 3. Shaft 58 is shown journaled in an elbow-bearing 59, which also affords a bearing for the shaft 60, at right-angles to shaft 58. (Figs. 1 and 4.) Shaft 60 is driven from the main shaft 7 by a sprocket-chain 61 passing around appropriate sprockets. On said shaft 60 is the drive-wheel 62, having an intermittent gear 63 which periodically engages a bevel pinion 64 on the shaft 58; thus imparting the necessary intermittent rotations to the feed-rollers for feeding inward the stay-feed-wire. In order to positively hold shafts 58 and 60 in proper relation during the intervals between feeds, so as to insure accurate initial engagement between the gears 63 and 64, shaft 58 has also a wiper 65, which contacts with an annular smooth surface or bearing 66 on the drive-wheel 62, except when the intermittent gear 63 engages the bevel pinion 64; the said annular bearing 66 having a break or interruption at 67 to allow the turning of the wiper during the engagement of the gears 63 and 64.

The speed of the machine being high, it is evident that the initial engagement between the gears 63 and 64, suddenly transmitting power to the feed-mechanism and instantly rotating the erstwhile stationary shaft 58, exerts a sudden heavy strain upon the gears. To take this initial strain, and avoid liability of breakage of the teeth by the shock, due to quick action of the machine, the gears 63 and 64 have each a great tooth or cog, as at 68, which coact at the outset of the engagement between said gears, each having of course also a wide space to accommodate these big teeth. The pitch of the big teeth is preferably equal to twice the pitch of the regular teeth. It may be stated here that this same expedient is utilized throughout the machine; the initially-coacting teeth of all intermittently-operating gears being preferably great teeth, to take the initial sudden strain, avoid liability of breakage, and preserve smooth regular action of the mechanism. Hence it will be unnecessary hereinafter to refer to the great teeth of the intermittent gears of various mechanisms, the purpose having been explained here.

From the shaft 60, the counter-shaft 48 is driven by the sprocket-chain 69 engaging sprocket-wheels on the shafts. Said shaft 48 has the cam 47 for actuating the mechanism (43, 44, 45, 46,) which forces the feed-rollers to more tightly grip the stay-feed-wire, during the feeding operation, as previously explained. Shaft 48 also has a cam 70, for actuating a lever 71 referred to presently in the description of the stay-feed-wire guiding mechanism.

In feeding the stay-feed-wire, it is essential to accurately guide the same across the strands, avoid any possibility of catching it in either the strands or the mechanism, and at the same time provide for accurately positing said stay-feed-wire against or upon the strands in proper position for engagement by the coilers and for applying the stay. The guiding and positing devices must also avoid interference with the twisters. Effective mechanism for accomplishing these purposes will now be described, with reference more particularly to Figs. 2, 3, 4, 7 and 8. The operation of positing the stay-feed-wire occurs preferably during the latter part of the period of feed of the strands, so that the interval of rest of the strands may be utilized for the stay-applying operation.

From the feed-rollers 40, the stay-feed-wire is shown passed through a guide-tube 72, pivoted at its inlet end and inclined downward toward its outlet end. See Figs. 3 and 4. The purpose of inclining the guide-tube is to direct the stay-feed-wire into the guides across the machine, which are below or offset from the strands. The purpose of pivoting its inlet end is to allow raising of its outlet end when the wire is lifted up out of its guides and placed against the strands; it being understood that the stay-feed-wire is fed under the strands, in the present mechanism, though the feed may be above, as before stated. However, numerous advantages arise from the under feed, which allows the effective organism of mechanism and stay-forming operation hereinafter described; and this is therefore considered a valuable point of the invention. For lifting the guide-tube, or raising it to approximately horizontal position, the lever 71 is shown, having an arm 71ᵃ provided with a roller 71ᵇ actuated by the cam 70 on shaft 48, as before mentioned. Said cam actuates the lever to raise the guide-tube simultaneously with the lifting of the stay-feed-wire out of its guides across the machine; and the cam holds the guide-tube so raised until the finished stay is cut or severed from the feed-wire. The guide-tube 72 is also capable of a lateral swinging movement, being moved by the stay-feed-wire from the initial position indicated by dotted lines in Fig. 3 to the full line position; the guides being slightly behind the coiler-heads against which the stay-wire is lodged preliminarily to the stay-making operation.

From the pivoted guide-tube 72 the stay-feed-wire passes through a series of alined guides 73, comprising substantially longitudinally-divided or separable tubes with funnel-shaped inlet ends. See Figs. 3, 4, 7 and 8. These guide-tubes or funnels are shown supported by brackets or standards on a transverse beam 74. One half-tube of each guide is carried by an arm 75 hinged at 77 to the arm 76 carrying the other half-tube, as more clearly shown in Figs. 4, 7, 8 and 14. Springs 78 may act upon the arms 75 and 76, to hold the half-tubes of 73 yieldingly closed together but allow them to separate or open when the stay-feed-wire is transferred or lifted out from the guides. This is performed by the lifters 86, which act between adjacent guides; each lifter being guided in its vertical movements between a depending lug 79 at the outlet end of one guide or half-tube thereof and the upright edges of the supporting arms 75 and 76 of the next tube (Figs. 4 and 7). However, instead of depending upon the springs 78 to hold the guides or funnels closed during the infeed of the stay-feed-wire, it is preferable to employ positive means for that purpose. Indeed this may be necessary where the stay-wire is not perfectly straight; for in that case the advancing end of the wire would force the funnels apart and escape. We therefore use a series of presser arms 80, carried by a rock-shaft 81. See Figs. 2 and 8. These pressers, one for each guide or funnel, bear against the hinged members or arms 75 of each guide and hold the guides positively closed during the entire time of feeding the stay-wire. Then the rock-shaft 81 carries the presser-arms away, in time to allow the wire to be lifted up out of the guide-tubes. With this mechanism, the springs 78 are unnecessary; though they may be used to yieldingly hold the funnels or guide-tubes closed except for the instant when the wire is lifted out, when the springs will yield. Furthermore, by the use of this positive closing means, there is scarcely any necessity to initially straighten the stay-feed-wire. Hence, referring back to the straighteners (Figs. 3 and 4), the rollers 36 may be adjusted to exert very little tension upon the stay-wire, which enables the coilers or twisters to more readily draw the lengths of wire for the knots, and increases the life of these tools. In Figs. 2 and 3, the rock-shaft 81 is shown having an arm connected to an actuating rod 82 carrying a roller 83 engaged by a cam 84 on the shaft 60, for actuating said rock-shaft 81 which carries the presser arms 80 aforesaid. The roller 83 is kept in proper place by means of a pivoted guide-link 85, shown having a yoke inclosing the lower end of rod 82 and its roller 83.

The lifters 86 are arms or levers attached to a rock-shaft, as 87. See Figs. 2, 3, 4, 7 and 8. They are guided between the adjacent funnels or guide-tubes 73 as aforesaid, and have suitable seats or depressions as at 88 to hold the stay-feed-wire as it is lifted up out of the guide-tubes. In Fig. 7 the lifters are shown holding the stay-wire up against or adjacent to the strands in position for engagement by the twister tool. In Fig. 8, the full lines show the lifters ready to lift out the stay wire, while the dotted lines show the lifters raised, having transferred the stay wire to the strands. In Fig. 3, the rock-shaft 87 is shown having an arm connected to an actuating rod 89 carrying a roller 90 engaged by an actuating cam 91 on the shaft 60.

92 is a pivoted guide-link, having a yoke holding the lower end of rod 89 and its roller 90, for keeping the latter in proper position.

Having been guided through the funnels or guide-tubes 73, and lifted by the lifters or levers 86 up against the strands, the stay-feed-wire must next be pushed back against the faces of the coilers or twisters, which are designated by the numeral 100. For this purpose, we preferably utilize, as in our machine of aforesaid Patent No. 721605, a series of beaters 93, shown attached to a rock-shaft 95. See Figs. 2, 4, 7 and 8. Said beaters comprise arms (one behind each twister), having flat circular faces 94 bifurcated to straddle the strands when pushing the stay-wire back against the twister-heads. The faces 94 of the beaters are preferably raised or project out from the arms 93, to permit revolution of the looping-pins of the twisters, as will be understood later; or the said faces may be larger and have annular depressions to accommodate said looping-pins, if preferred. While the stay-feed-wire is being fed, and before it is transferred or lifted out of the guides 73, the beaters remain back away from the twister-heads, as shown in full lines in Fig. 8. But as soon as the lifters transfer the stay-wire to the strands, the rock-shaft 95 moves the beaters toward the twister-heads; and said beaters thus push the wire against the twister-heads and hold it there during the stay-making and applying operation, as indicated by dotted lines in Fig. 8. It will be seen that the function of the lifters 86 is to displace the stay-wire from the guides and elevate it to within reach of the beaters 93 and then act as guides for the beaters to bring the stay-wire within the operation of the tools of the twister-heads. In Figs. 2 and 3, the rock-shaft 95 is shown having an arm connected to an actuating rod 96 carrying a roller 97 engaged by an actuating cam 98 on the shaft 60.

Number 99 is a pivoted guide link, having a yoke embracing the roller 97. A retractile spring 99ᵃ may be used to quickly rock the rock-shaft for moving back the beaters, when the roller 97 is dropped by the cam 98. Similar springs may be used for quickening the reverse movements of the lifters 86 and guide-pressers 80, but it is deemed unnecessary to illustrate such well-known expedients.

As before stated, the preceding operations of feeding, guiding and positing the stay-feed-wire are preferably performed during the feed of the strands, for utilizing time to best advantage. The stay-wire having now been placed in position, the next operation is the attachment thereof to the strands, which is done during the interval of rest of the strands. It will be remembered that, the strands being at rest, the stationary jaws are now gripping and holding them taut, while the traveling jaws 15 are moving forward to obtain a new grip upon the wires, preliminary to the next intermittent feed. However, the mechanisms and principles employed in the stay-applying operation are also applicable to the performance of the same function during movement of the strands, as in a machine where the strands have a continuous movement, or where the stay-applying mechanism is moved by a carriage.

For clearer understanding of the stay-forming and applying mechanism, it will be advantageous to describe first the specific construction and action of one of the twisters, all of which in the illustrations are substantially alike. Referring then to Figs. 3, 6, 8, 9, 10, 11 and 12, 100 denotes the twister-head on the spindle 101, which is journaled in suitable bearings 102. The spindle and its twister-head are axially bored to receive the strand X which is threaded therethrough. It is understood that in the stay-making operation the stay-feed-wire Y is lodged against the strand, crosswise thereof, and is also held against the face or rear end of the twister-head. This end of the twister-head has a slot or cut-away portion 103, from the periphery to and around the axis; which slot receives the loop when formed in the stay-feed-wire. Numbers 104 and 105 denote twisting, coiling or wrapping rollers, a pair of which are shown journaled at opposite sides of the axial bore of the twister, and preferably approximately countersunk in recesses in the end of the coiling head. The opposed peripheries of the rollers are exposed within the slot or cut-away portion 103; and preferably the rollers are journaled at such distances from the axis of the twister as to leave approximately only the space of the thickness of the stay-wire between the strand and the periphery of each roller. Number 106 denotes a twister-tool or looping pin, slidable in a longitudinal eccentric bore or socket in the twister head, so as to revolve therewith; and adapted to protrude and retract, protrusion being into the slot 103 and past the face of the twister. For this purpose, the looping-pin is connected to a slidable throw or collar 107 on the spindle 101; which collar is actuated at proper periods by the rocking yoke 108 shown in Figs. 1, 2, 3, 8 and 9. The protruding end of the looping-pin is hooked, as shown more clearly in Figs. 10, 11 and 12. The looping-pin has a projection 109, lying in a recess or cut-away part of the collar 107, and spring-held so as to hold the looping-pin with its hook pointing outward or toward the periphery of the twister-head. But the looping-pin is adapted to turn to point its hook toward the axis of the twister-head, as in Fig. 12. This is accomplished at proper periods by engagement and tripping of the projection 109 by a trippet or toe 110. Now in the stay-making operation, at the initial rotation of the twister, the looping-pin 106 protrudes; it engages under the taut stay-feed-wire; and in revolving it loops said wire by pulling the engaged portion thereof over and around the strand. At the same time, the looping-pin retracts, so that its hook pulls the loop into the recess 103 in the twister-head. By the time the loop is formed and drawn into said recess (which requires about a three-fourths rotation of the twister) the looping-pin is turned, by tripping the finger 109 thereof, so that the hook points toward the axis of the twister and is withdrawn through the loop; thus releasing the loop from the looping - pen. On continued rotation of the twister, the advancing revolving roller 104 engages the loop close to the strand, or practically at the body of the stay-wire itself, and twists, coils or wraps said loop closely around the strand; while the other roller 105 follows and aids in the same operation, also pressing and securing the twist or knot, which is thus tightly compressed on the strand without tendency to relax. The operation is well illustrated in the different views of Figs. 6, 10, 11 and 12. It is observable that one twisting roller (as 104) would be sufficient, through two opposed rollers are preferable. Since the stay wire abuts or lies lengthwise against the twister-head at one side of the strand, the effect of the conjoint wire-drawing and retracting action of the looping pin is to loop the wire over or around the strand with both parts of the loop lying upon the strand, instead of one upon the other; and, by reason of the slight space between the strand and the acting peripheries of the rollers, the loop or portion of the stay-feed-wire which is being wound or coiled is held tightly against the strand, the convolutions of the coil are prevented from over-lapping and are wound and rolled compactly; insuring rigid and durable knots or connections. Three rotations of the twister are ample for performing the whole operation.

At the end of the operation of making the loop and twisting it about the strand, the same operation having been progressively performed on all the strands, and the finished stay having been severed from the stay-feed-wire, the next intermittent feed of the strands occurs, drawing the connections or knots between the stay and strands out from the twister heads. During this intermittent feed of the strands, the stay-feed-wire is again fed across the strands, guided and posited in position, ready for the next stay-making and attaching operation.

The coilers or twisters, with the accessory devices thereof, may be actuated by any appropriate mechanism, for example by a reciprocatory member having a rack or intermittent racks adapted to engage the several twisters progressively, at the proper periods. However, as an important part of our invention, we have devised exceedingly effective actuating mechanism, particularly adapted to the work and peculiar stay-applying mechanism of the present machine.

This will now be described, in connection with one coiler or twister.

The coiler or twister is rotated at the proper periods by an actuating wheel 111, having an intermittent gear 112 which engages a bevel pinion 113 on the twister-spindle. See Figs. 3 and 8. The twister-spindle 101 has also a wiper 114, which contacts with an annular smooth surface or bearing 115 on the drive-wheel to hold the twister in fixed position during the interval between successive stay-making operations; said annular bearing having a break or interruption at 116 to allow rotation of the wiper during operation of the twister. The drive-wheel 111 is also conveniently utilized as the actuator for the sliding collar 107 on the twister-spindle. The mechanism employed in this connection comprises a cam 117 on the drive-wheel which actuates a lever 118 fulcrumed on the shaft 119 and having a rocker-arm 120 to which is attached the yoke 108 which controls the said sliding collar 107. The cam 117 lifts the lever 118 at the point 117$^a$, to retract the looping-pin 106 for drawing the loop of the stay wire into the slot 103 of the twister-head or between the twisting rollers 104, 105, and holds said lever raised while the loop is being coiled or twisted around the strand till the point 117$^b$ of the cam is reached, when the lever is lowered to project the looping-pin into position for engaging the next stay wire and drawing the loop thereof. When the looping-pin 106 retracts, to bring the loop of the stay wire in between the twisting rollers, said looping-pin also turns to disengage its hook from the loop, as before explained; this being accomplished by the tripping of the finger or projection 109 by the toe 110 as aforesaid. This toe or trippet 110 may be stationary, or it may be carried by a movable part adapted to bring said trippet into position for engaging the finger 109 at the proper periods. In Figs. 8 and 9 it is shown carried by a rod 121 actuated by a cam 122 on a shaft 123, which shaft may be driven by chain and sprockets (not shown) or otherwise from the shaft 60. It is understood that the single mechanism here described is multiplied for the several twisters.

All the twisters and correlated mechanisms may be substantially similar, but in the illustrated machine an exception exists in the case of the first twister, which is the one farthest from the feed-rollers 40 that feed the stay wire across the strands. This first twister does not form a loop in the stay wire, but merely coils or twists the extremity of said wire around the farthest or outermost strand of the series. Hence it is desirable to rotate this twister in a reverse direction to the rotation of the others. This is for the following reason. It it understood that each looping-pin 106 (of the second and following twisters), as it forms the loop in the stay-wire, draws in an additional length of said wire, sufficient to provide material for the loop; and obviously it is desirable for the looping-pins to engage and draw the stay-wire at the sides of the strand nearer or toward the feed rollers 40, as shown in Fig. 6. Here the looping-pins (for the second and following twisters) are shown adapted to engage under the stay wire, at the right-hand sides of the respective strands, and loop it over the strands toward the left. Since the first twister acts upon the extremity of the stay wire, it should engage under said extremity of the stay wire, at the left-hand side of the outermost strand, and bend it over said strand toward the right. Furthermore this action provides tension in the stay wire between the first and second twisters. And the first and second twisters may act practically or nearly simultaneously; it being only necessary for the stay wire to be engaged and held on the outermost or first strand when the looping-pin of the second twister draws the loop over the second strand. The other twisters should operate in progression, as before stated. The stay wire is tensioned between the second and third twisters, and between every adjacent pair of twisters, by the tension resulting from the successive loop drawing; the stay-feed-wire being successively pulled in between the gripping feed-rollers 40 by the looping-pins. The arrangement here described is not absolutely essential, but is desirable for the foregoing reasons. For rotating said first twister in an opposite direction to the others, various expedients may be employed.

An efficient construction of reversing mechanism is shown in Figs. 15, 16, and 17. Here the twister 100 is carried by a short spindle 124, in alinement with the usual twister-spindle 101. Spindle 101 has a gear 125, meshing with an idler 126, which meshes with an idler 127, which drives a pinion 128 on spindle 124 and thus imparts to said spindle 124 and its twister, rotation in a direction opposite to that of the other twisters. The gearing 125 to 128 is contained in a suitable box 129. Inasmuch as the first twister does not form a loop, the usual looping pin may be omitted; though the said looping pin may still be used for primarily engaging the extremity of the stay-feed-wire and bending it over the strand and pulling it into the recess 103 of the twister-head. But, in the illustrated machine, this first or end twister does not carry the looping-pin and actuating sliding collar therefor, as in the other twisters. With this particular twister, its slot 103 lies horizontal at the outset, to readily receive the end of the stay wire, which is driven sidewise into said slot by a simple beater 93* vibrating with the beater-shaft 95 (Fig. 3) and located outside the twister and having sufficient stroke to more than drive the wire to the base of the slot. The principle is the same as that utilized with respect to the end twisters in the machine of said Patent No. 721605, wherein the end beaters were provided with fingers to bend or snap the extremities of the stay wire into the recesses of the twister-heads or between the twister-rollers; and the same expedient is applicable here if desired. The same may be said of the last twister of the series, or the one nearest to the feed-rollers 40. Said last twister may operate like the intermediate ones, that is it may loop the stay wire and coil or twist the loop around the strand, and the stay may then be severed by the knives or cutter from the stay-feed-wire. But it is preferable to first cut the stay wire, immediately after the action of the twister adjacent to the last (or the twister nearest but one to the feed-rollers); and then have the last twister twist the extremity of the stay around the outermost strand. Hence the last twister may have a retractable pin for engaging and pulling the extremity of the stay into the twister-head, or the coactive beater may be provided with a finger for snapping said extremity into place; or this may be done by the knives.

Thus far we have considered the coilers or twisters and actuating mechanism singly. The arrangement of the mechanisms in series will next be described.

The several twisters are shown arranged in a series across the machine, the spindles 101 being journaled in the bearings 102 on the transverse beams 130. See Figs. 3, 6 and 8. It is preferable for the first twister and second twister to act substantially or nearly in unison, though they rotate in reverse directions, as before stated. This concurrent action enables the first twister to bend up and coil or twist the extremity of the stay-feed-wire around the outermost strand as the looping-pin of the second twister draws the loop and bends it in the opposite direction around the second strand. In any event, the first twister should operate either before or simultaneously with the second twister; so as to secure a hold of the stay-feed-wire on the first strand before or during the action of the second twister in looping it around the second strand. The other twisters operate in progression, so that the looping-pin of each twister draws in the necessary additional length of the stay-feed-wire for the loop before the next looping-pin engages said stay-feed-wire. As stated in the introductory remarks, the purpose of the progressive action of the twisters is to avoid drawing the loops simultaneously, which would result in breakage of the stay-feed-wire; because the looping-pin of each twister draws in an additional length of the stay-feed-wire, to provide material for the loop, and this additional length has to come from the part of the stay-feed-wire disengaged from the coiling mechanism. It will be observed from Figs. 3 and 13 that the arrangement of the drive-wheels 111 on the shaft 131 is such as to insure this progressive action; the several drive wheels being set back at successively different angles. In Figs. 2 and 13, the shaft 131 is shown having a bevel gear 132 meshing with bevel gear 133 on inclined shaft 134. Shaft 134 has a bevel gear 135 which is intermittently engaged by an intermittent gear 136 on the main shaft 7; which thus imparts intermittent rotation to the shaft 131, so as to operate the twisters and coacting devices during the interval of rest of the strands. Shaft 134 has also a wiper 137 which contacts with an annular smooth surface or bearing 138 on the gear 136, during the feed of the strands, so as to avoid movement of the power transmission mechanism between the main shaft 7 and drive-wheel shaft 131 during said feed. Said bearing 138 has a break or interruption at 139 to permit rotation of the wiper during engagement between the gears 136 and 135. The shafts 7 and 134 are shown journaled in the same elbow bearing 140, which maintains the proper relation between the gears.

At the completion of each stay-applying operation, the finished and attached stay is cut off or severed from the stay-feed-wire, by any suitable knives or cutting mechanism; or, as before remarked, the cutting may be done before the action of the last twister (that nearest the feed-rollers 40), and said twister may then coil or twist the extremity of the stay wire around the last or outermost strand; the latter arrangement being in fact preferable. The cutters shown in Figs. 1, 3 and 4 comprise a fixed knife 141, and a coacting movable knife 142. The movable knife is shown pivoted and actuated by a rod 143 shown connected to a lever 143ᵃ having a roller 144 in a cam-groove of a cam-wheel 145 on the shaft 131, the same cam-groove of the cam-wheel 145 being a circular or annular groove with a bulge or projection for moving said roller 144 so as to actuate the knife. Said lever 143ᵃ is pivoted to a fixed part of the machine frame.

The action of the various mechanisms being now understood, it will be sufficient to briefly summarize the operation of the illustrated machine. As before stated, the reciprocating jaws 15 intermittently grip and pull back the fabric, thus imparting the intermittent feed to the strands. During the interval of pause between feeds, the wires are gripped by the stationary jaws 14. Thus the wires are always held taut between the tensioning devices and one or the other of the sets of jaws. During the feed of the strands, the stay-feed-wire is also fed by the feed-rollers 40 across the machine, through the guides 73, and it is lifted by the lifters 86, and pushed by the beaters 93 back against the faces of the twister-heads 100; thus positing the stay-feed-wire in proper position for formation and attachment of the stay. At this phase of the operation, the reciprocating jaws have reached the limit of their rearward travel; and the stationary jaws now grip the wires, which are thus held at rest, while the reciprocating jaws release the same and then move backward to obtain a new grip preliminarily to the next feed. During the rest of the strands, motion is transmitted to the twister-actuating-shaft 131 through the inclined shaft 134, thus rotating the series of drive-wheels 111, which actuate the twisters, or stay forming and attaching mechanisms in progression, thus forming and attaching the stay, in the manner hereinbefore fully explained. At the completion of this operation, or immediately preceding the action of the last coiler or twister, the finished stay is severed or cut off from the stay-feed-wire. The stay having thus been formed, attached and severed, the reciprocating jaws at the limit of their forward travel have again gripped the fabric. The stationary jaws now release the same, while the reciprocating jaws move rearward, thus making the next feed of the strand, while simultaneously the stay-feed-wire is fed across the machine and posited in position for the next stay forming and attaching operation. The finished fabric as it is drawn rearward by the traveling jaws is continuously wound by the reel onto a bundle or bale, which may be subsequently detached by removal of the reel from the machine, as well understood.

It will be understood that various modifications may be made in the arrangement and correlation of mechanisms, as well as in the several mechanisms themselves, without departing from the scope of our invention.

Having thus fully described our invention what we claim as new and desire to secure by Letters Patent of the United States, is:—

1. A wire fabric loom, including a series of rotary twisters arranged to apply a stay to a series of line wires, and operating mechanism therefor including a graduated series of twister-operating gears arranged to come into action one after another.

2. A wire fabric loom, including a series of combined stay-wire looping and twisting devices, means for feeding a stay to all of said devices, and means for operating the devices successively, after the stay has been fed to all of said devices, to form stay loops and wrap said loops upon line wires.

3. A wire fabric loom, including a series of combined stay-wire looping and twisting devices, means for feeding a stay simultaneously to all of said devices, and means for operating said devices to form stay loops and to wrap said loops upon line wires.

4. A wire fabric loom, including a series of combined stay looping and twisting devices, means for feeding a stay to all of said devices simultaneously, and means for operating certain of said devices simultaneously to form loops in the stay and to wrap said loops upon line wires.

5. A wire fabric loom, including a series of twisters, and twister operating mechanism including a series of driving gears, one for each twister, said driving gears being arranged out of line and said twisters being in line, whereby relative movement of the gears and twisters will cause the twisters to be brought into action one after another.

6. A wire fabric loom, including a series of wire connecting devices adapted to connect a stay to a series of line wires, means for feeding a stay length across the series of line wires before the connecting devices begin to operate, and means for bringing certain of said devices into action successively beginning with a device located at an intermediate point of the series.

7. A wire fabric loom, including twisters for connecting a stay to a series of line wires, means for feeding a stay length across the series of line wires before the twisters begin to operate, twister operating means arranged to twist a stay wire around certain of the line wires at different times beginning with a line wire located at an intermediate point of the series.

8. A wire fabric loom, including a series of twisters arranged to twist a stay around a series of line wires, means for feeding a stay length across the series of line wires before the twisters begin to operate, and twister operating means arranged to bring the twisters of a series into action successively, beginning with a twister associated with one of the intermediate line wires.

9. A wire fabric loom, including a combined looper and twister having a looping pin, and means for feeding a stay sidewise into position to be engaged by said pin.

10. A wire fabric loom, including a series of stay applying devices, a stay guide, and means for yieldingly urging the stay laterally out of the stay guide and into position to be engaged by the applying devices.

11. A wire fabric loom, including a series of combined loopers and twisters, stay feeding means arranged to feed a stay laterally to the combined loopers and twisters, means for feeding a stay wire longitudinally to said means, and means for severing a stay length from the stay wire.

12. A wire fabric loom, including a series of combined stay loopers and twisters, a series of presser feet associated therewith, and means for effecting the simultaneous movement of the presser feet.

13. A wire-fabric-making machine having, in combination, means for feeding a series of strands, means for successively placing a stay-wire across the said series, and mechanism for forming a plurality of loops in the stay-wire while so placed and twisting said loops around corresponding strands.

14. In a wire-fabric-making machine, a series of mechanisms for forming a plurality of loops in a stay-wire and twisting said loops around a corresponding plurality of strands while the stay-wire is placed across the whole number of strands, said mechanisms timed to begin their operations in such rapid progression that a number are in simultaneous action, while yet allowing each mechanism to take up the required length of stay-wire to supply a loop before take-up of said stay-wire for the next loop.

15. A wire-fabric-making machine having, in combination, means for supporting a series of strands, means for placing a stay-wire across the said series and supporting it adjacent to the strands, and a progressively-operating series of mechanisms for drawing portions of the stay-wire over corresponding strands in the form of loops and twisting said loops around the strands.

16. A wire-fabric-making machine having, in combination, means for feeding a series of strands, means for intermittently feeding a continuous stay-feed-wire across said series from one side, and a progressively-operating series of mechanisms adapted to draw portions of the stay-feed-wire in the form of loops over corresponding strands and twist said loops around said strands, said series of mechanisms operating during the interval between successive periods of feed of the stay-feed-wire.

17. A wire-fabric-making machine having, in combination, mechanism for feeding a series of strands, mechanism for successively feeding a stay-feed-wire across and placing it adjacent to the said series of strands, stay-applying mechanism operating between the intervals of feed of said stay-feed-wire comprising means for bending intermediate portions out of the length of the stay-feed-wire over the strands and twisting the same around the strands, and a periodically acting cutter for severing the finished stay from the stay-feed-wire.

18. A wire fabric-making machine having, in combination, mechanism for holding a series of strands, mechanism for placing a stay-wire across and against the said series of strands, stay-applying mechanism operating on said stay-wire while held against said strands and comprising means for bending intermediate portions out of the length of the stay-wire over the strands, and twisting the same around the strands, and feed-mechanism for one of the previously-named mechanisms whereby successive stays are attached at intervals to the strands.

19. A wire-fabric-making machine having, in combination, means for holding a series of strands, mechanism for bending a series of loops in a stay-wire while held across and adjacent to the said series of strands, and mechanism for twisting said loops around the strands.

20. A wire-fabric-making machine having, in combination, mechanism for intermittently feeding a series of strands, mechanism for simultaneously feeding and placing a stay-wire across and adjacent to the said series of strands, and stay-applying mechanism operating between the intervals of feed and comprising means for bending intermediate portions out of the length of the stay-wire and twisting the same around the strands, and a periodically-acting cutter for severing the finished stay from the stay-feed-wire.

21. A wire-fabric-making machine having, in combination, means for holding a series of strands, mechanism for progressively bending a series of loops in a transversely-placed stay-wire while held adjacent to the said series of strands, and mechanism for twisting said loops around the strands.

22. A wire-fabric-making machine having, in combination, mechanism for intermittently feeding a series of strands, mechanism for intermittently feeding a stay-feed-wire successively across and placing it adjacent to the said series of strands, stay-applying mechanism operating between the periods of feed and comprising means for progressively bending the extremity of said stay-feed-wire and intermediate portions out of the length thereof over the respective strands and twisting the same around the strands, and a periodically-acting cutter for severing the attached stay from the stay-feed-wire.

23. A wire-fabric-making machine having, in combination, means for holding a series of strands, and mechanism for progressively bending a series of loops in a stay-wire while held adjacent to the said series of strands, and concurrently twisting said loops around the strands.

24. A wire-fabric-making machine having, in combination, means for holding a series of strands, means for securing the extremity of a cross-wire to one of said strands, and a plurality of progressively-acting devices each of which draws a loop from the cross-wire while held against the several strands and twists the same around the particular strand, the drawing in of the cross-wire for providing the successive loops being toward its aforesaid extremity.

25. A wire-fabric-making machine having, in combination, means for feeding a series of strands, mechanism for successively feeding and placing a stay-feed-wire across and adjacent to the several strands, means for securing the extremity of said stay-wire to one of said strands, and a plurality of progressively-acting devices each of which draws a loop from the stay-wire and twists the same around a particular or respective strand, the feed-mechanism for the stay-feed-wire allowing it to be drawn in toward its aforesaid extremity, for providing the successive loops.

26. A wire-fabric-making machine having, in combination, means for holding a series of strands, means for holding a stay-wire across the several strands, and mechanism for successively bending intermediate portions of the stay-wire while so held into loops at intervals and twisting said loops around the strands.

27. A wire-fabric-making machine having, in combination, mechanism for intermittently feeding a series of strands, mechanism for simultaneously feeding a stay-wire across the strands, and stay applying mechanism acting during the interim of pause comprising means for securing the extremity of said stay-wire to the outermost or farthest strand and a plurality of progressively-acting devices each of which draws a loop from the stay-wire and twists the same around a respective strand, the drawing in of the cross-wire for providing the successive loops being toward its aforesaid extremity, and a periodically acting cutter for severing the attached stay from the stay-feed-wire.

28. A wire-fabric-making machine having, in combination, mechanism for intermittently feeding a series of strands, mechanism for successively feeding a stay-feed-wire across the entire series of strands, a series of progressively acting mechanisms operating during the interims of pause for bending portions from the length of said wire and twisting the same around the strands, the feed-wire being successively drawn inward by said mechanisms to furnish the additional lengths taken up by said bent and coiled portions, and a periodically-acting cutter for severing the finished stay from the feed-wire.

29. A wire-fabric-making machine having, in combination, a plurality of progressively-acting stay-applying mechanisms comprising rotatable spindles axially-bored for passage of the strands therethrough and having twisting rollers and looping-pins adapted to draw portions of a stay-wire placed across the strands into engagement by said twisting-rollers, and actuating mechanism therefor.

30. A wire-fabric-making machine having, in combination, a plurality of progressively-acting stay-applying mechanisms comprising revolving twisting-devices and associated retractable hooked looping-pins adapted to draw portions of a stay-wire placed across the strands into engagement by said twisting-devices, and actuating mechanism therefor.

31. A wire-fabric-making machine having, in combination, mechanism for intermittently feeding a series of strands, mechanism for successively feeding a stay-wire across the strands during the feed of the latter, and mechanism for forming loops in said stay-wire and securing the same to the strands during the intervals of rest.

32. A wire-fabric-making machine having, in combination, a plurality of progressively-acting stay-applying mechanisms comprising twisting-devices and looping-pins adapted to draw portions of a stay-wire while placed across the series of strands into engagement by said twisting-devices, mechanism for intermittently feeding the strands through said stay-applying mechanisms, mechanism for intermittently feeding a stay-wire across the series of strands, and mechanism for actuating said stay-applying mechanisms during the interval of rest of the strands and stay-wire.

33. A wire-fabric-making machine having, in combination, a progressively-operating series of rotary twisters for attaching a stay-wire crosswise to a series of strands, and means for supporting said stay-wire across the said series of strands and in position for engagement by the said series of twisters, said twisters having looping-tools for engaging said stay-wire and drawing portions thereof in the form of loops over the corresponding strands, means for releasing said tools from said loops, and means for twisting said loops around the strands.

34. A wire-fabric-making machine having, in combination, mechanism for intermittently feeding a series of strands, mechanism for successively feeding a stay-wire across the strands, means for holding said stay-wire against all the strands, and mechanism for forming loops in said stay-wire and securing the same to the strands during the intervals of rest.

35. A wire-fabric-making machine having, in combination, a plurality of stay-applying mechanisms comprising rotatable spindles axially-bored for passage of the strands therethrough and having twisting-heads provided with devices for engaging and drawing portions of a transversely placed stay-wire and twisting the same around the strands, means for feeding a stay-wire across the strands, guides for said stay-wire, positing mechanism for transferring said stay-wire from said guides to position for engagement by the twisting-heads, and actuating-mechanisms for the before-named mechanisms.

36. A wire-fabric-making machine having, in combination, a series of twisters for attaching a stay-wire to a series of strands, means for feeding the stay-wire across the series of strands, a plurality of alined guides for guiding said stay-wire as it is fed, a plurality of rocker-arms for displacing said stay-wire laterally from said guides, and a series of rocker-arms for beating said stay-wire within action of the twisters, the first-mentioned rocker-arms moving the wire within reach of the latter rocker-arms and adapted to guide the wire as it is beaten to the twisters.

37. A wire-fabric-making machine having, in combination, means for feeding a series of strands, a series of twisters, actuating mechanism therefor, means for feeding a stay-wire across the strands, a plurality of alined guides for guiding said stay-wire during its feed, and means for transferring the stay-wire laterally from said guides and holding it against the strands in position for engagement by the twisters.

38. A wire-fabric-making machine having, in combination, means for feeding a series of strands, a series of twisters, a plurality of tubular guides transversely-disposed to the strands and comprising longitudinally-separable parts spring-held together, means for successively feeding a stay-wire therethrough, and transferring devices for forcibly transferring the stay-wire from said guides against the spring-resistance thereof and placing it adjacent to the strands in position for engagement by the twisters.

39. A wire-fabric-making machine having, in combination, means for feeding a series of strands, a series of twisters, actuating mechanism therefor, means for feeding a stay-wire across the strands, means for guiding the stay-wire during its feed, devices for transferring the stay-wire and holding it adjacent to the strands, and a series of beaters for moving and holding the stay-wire adjacent to the faces of the twisters.

40. A wire-fabric-making machine having, in combination, means for feeding a series of strands, a series of twisters, actuating mechanism therefor, means for feeding a stay-wire across the strands, a plurality of tubular guides for guiding the stay-wire during its feed, said tubular guides adapted to open or separate to release the stay-wire, and devices for transferring the stay-wire from said guides and placing it adjacent to the strands in position for engagement by the twisters.

41. A wire-fabric-making machine, having in combination, means for feeding a series of strands, a series of twisters, a plurality of tubular guides transversely-disposed to the strands and comprising longitudinally-separable parts, means for positively holding said guides closed and adapted to allow them to open at intervals, transferring devices for transferring the stay-wire from said guides when allowed to open and placing it adjacent to the strands in position for engagement by the twisters.

42. A wire-fabric-making machine having, in combination, means for feeding a series of strands, a series of twisters, actuating mechanism therefor, means for feeding a stay-wire across the strands, a plurality of alined guides for guiding the stay-wire during its feed, devices for transferring the stay-wire from said guides against the strands, and a series of beaters for moving and holding the stay-wire against the faces of the twisters.

43. A wire-fabric-making machine having, in combination, a series of twisters, means for feeding a series of strands therethrough, actuating mechanism for said twisters, means for feeding a stay-wire across and under the strands, a plurality of tubular guides for guiding the stay-wire during its feed, said tubular guides adapted to open or separate to release the stay-wire, during its feed, said tubular guides adapted said guides and holding it up adjacent to the strands in position for engagement by the twisters.

44. A wire-fabric-making machine having, in combination, means for feeding a series of strands, a series of twisters, a plurality of tubular guides transversely-disposed to the strands and comprising longitudinally-separable parts, a rock-shaft having a series of pressers adapted to hold said guides closed and adapted to be moved away to allow them to open, and devices for transferring the stay-wire from said guides when allowed to open and placing it against the strands in position for engagement by the twisters.

45. A wire-fabric-making machine having, in combination, a series of twisters for attaching a stay to a series of strands, means for feeding the stay-wire under and across the strands, and a plurality of lifters for lifting and holding the stay-wire adjacent to the strands, together with a series of beaters for pushing and holding the stay adjacent to the twister-faces during the stay-attaching operation.

46. A wire-fabric-making machine having, in combination, a series of twisters for attaching a stay to a series of strands, means for feeding the stay-wire under and across the strands, separable guide-tubes for guiding the stay-wire across, and a rock-shaft carrying a plurality of lifters located between the guide-tubes for transferring or lifting up the stay-wire adjacent to the strands.

47. A wire-fabric-making machine having, in combination, means for feeding a series of strands, a series of mechanisms through which the strands are threaded having devices for securing a transverse stay-wire to the strands, means for feeding the stay-wire across the strands, a plurality of separable tubular guides for said stay-wire, a plurality of devices for transferring the stay-wire from said guides to the strands, and a series of beaters for pushing and holding the stay-wire to position for engagement by the stay-attaching mechanisms.

48. A wire-fabric-making machine having, in combination, means for feeding a series of strands, a series of twisters through which the strands are threaded having devices for engaging and drawing intermediate portions of a transverse stay-wire and twisting the same around the strands, means for feeding the stay-wire across the strands, a plurality of separable tubular guides for said stay-wire, a plurality of devices for transferring the stay-wire from said guides to the strands, and a series of beaters for pushing and holding the stay-wire to position for engagement by the twisters.

49. A wire-fabric-making machine having, in combination, a stay-applying mechanism for attaching a stay-feed-wire to a plurality of strands, feed-mechanism for feeding the stay-wire across the strands at a distance therefrom, guides for guiding said stay-feed-wire across, a swinging or pivoted guide-tube for directing said stay-feed-wire from said feed-mechanism to said guides, and means for transferring the stay-feed-wire from said guides and placing it adjacent to the strands.

50. A wire-fabric-making machine having, in combination, stay-applying mechanism for attaching a stay-feed-wire to a plurality of strands, feed-mechanism for feeding the stay-wire across the strands and under the same, guides for guiding said stay-feed-wire across, a pivoted guide-tube for directing said stay-feed-wire from said feed-mechanism to said guides, and means for transferring the stay-feed-wire from said guides and placing it adjacent to the strands.

51. A wire-fabric-making machine having, in combination, a series of mechanisms for attaching a stay-wire to a series of strands, a drive-shaft, and a series of drive-wheels set at successively-different angles thereon and geared to said mechanisms for operating them in progression.

52. A wire-fabric-making machine having, in combination, a series of twisters for attaching a stay-wire to a series of strands, said twisters having reciprocatory lopping-pins and slidable actuating collars therefor, a drive-shaft, and a series of drive-wheels set at successively-different angles thereon and geared to said twisters for operating them in progression, and said wheels having cams for operating actuating levers for said actuating collars.

53. In a wire-working machine, a rotary twister axially-bored to receive the strand and having a recess in its working face and a hooked pin protruding at said recess adapted to engage a portion of a transversely-placed wire and draw it into said recess while bending it over or around the strand, and a twisting-device for twisting said portion of the wire around the strand, and actuating mechanism for said twister.

54. In a wire-working machine, a rotary twister axially-bored for passage of the strand and carrying a revolving twisting device and a retractable hook adapted to engage a portion of a transversely-placed wire and draw it into engagement by said twisting device, and actuating mechanism therefor.

55. In a wire-working machine, a rotary twister axially-bored to receive the strand and having a recess in its working face and a hooked pin protruding at said recess adapted to engage and loop a portion of a transversely-placed wire and draw it into said recess while bending it around the strand.

56. In a wire-working machine, a rotary twister axially-bored for passage of the strand and carrying a revolving twisting device and a retractable hook adapted to engage a portion of a transversely-placed stay-wire and draw it into engagement by said twisting device, the said hook being adapted to turn to release said stay-wire, and actuating mechanism therefor.

57. In a wire-working machine, a rotary twister axially-bored for passage of the strand and having a reciprocatory hooked looping-pin adapted to engage and bend around the strand an intermediate portion or loop from a transversely-placed stay-wire, simultaneously pulling the loop inward, and carrying a twisting device for twisting said loop around the strand; and actuating mechanism therefor.

58. In a wire-working machine, a rotary twister axially-bored to receive the strand and a retractable hooked pin adapted to engage a portion of a transversely-placed wire and draw a loop therein around the strand for attachment thereto by the twisting device, and actuating mechanism for said twister.

59. In a wire-working machine, a rotary twister axially-bored for passage of the strand and carrying a revolving twisting device and a retractable hook adapted to engage an intermediate portion of a transversely-placed stay-wire and draw it into a loop around the strand and into engagement by said twisting device, and actuating mechanism therefor.

60. In a wire-working machine, a rotary twister axially-bored for passage of the strand and having a looping pin adapted to engage and draw around the strand an intermediate portion or loop from a transversely-placed stay-wire and carrying a twisting roller for twisting said portion around the strand; and actuating mechanism therefor.

61. In a wire-working machine, a rotary twister axially-bored for passage of the strand and having an eccentrically-disposed hooked looping-pin adapted to engage and bend around the strand a loop from an intermediate portion of a transversely-placed stay, a twisting device for securing the loop to the strand, means for retracting said pin to pull the loop into engagement by said twisting device, means for turning the pin to disengage its hook from the loop; and actuating mechanism therefor.

62. In a wire-working machine, a rotary twister axially-bored for passage of the strand and carrying a revolving roller and a retractable hook adapted to engage and draw a portion of a transversely-placed wire into engagement by said roller.

63. In a wire-working machine, a rotary twister axially-bored for passage of the strand and carrying opposed revolving rollers and a retractable hooked pin adapted to engage and draw a portion of a transversely-placed wire in between said rollers.

64. In a wire-working machine, a rotary twister axially-bored for passage of the strand and having an eccentrically-disposed hooked looping-pin adapted to engage and bend around the strand a loop from an intermediate portion of a transversely-placed stay and adapted to turn to disengage its hook from the loop; and actuating mechanism therefor.

65. In a wire-working machine, a rotary twister comprising an axially-bored spindle for passage of the strand and carrying a revolving twisting device and a looping-pin for drawing a loop in an intermediate portion of transversely-placed wire for engagement by said twisting device.

66. In a wire-working machine, a rotary twister axially-bored for passage of the strand and carrying a revolving roller and a retractable hook adapted to engage and draw a portion of a transversely-placed stay-wire into engagement by said roller, and means for turning said hook when retracted to disengage it from the stay-wire.

67. In a wire-working machine, a rotary twister axially-bored for passage of the strand and carrying opposed revolving rollers and a retractable hooked pin adapted to engage a transversely-placed wire and draw a loop therefrom in between said rollers, and means for turning the hook to disengage it from said loop.

68. In a wire-working machine, a twister comprising a rotary spindle axially-bored for passage of the strand and having a twisting-head carrying a revolving twisting-device and a retractable hooked pin for engaging and drawing a portion of a transversely-placed wire into engagement by said twisting-device, means for driving said spindle, a slidable collar on said spindle connected to said pin, and timed mechanism for sliding said collar to retract the pin.

69. In a wire-working machine, a rotary-twister axially-bored for passage of the strand and carrying a revolving roller and a retractable hook adapted to engage and draw a portion of a transversely-placed wire into engagement by said roller, in combination with a beater for holding the cross-wire against the twister, said beater being formed to permit free revolution of the hook.

70. In a wire-working machine, a twister comprising a rotary spindle axially-bored for passage of the strand and having a twisting-head carrying a revolving twisting-device and a retractable hooked looping-pin for engaging and drawing a loop from a transversely-placed wire into engagement by said twisting-device, means for driving said spindle, a slidable collar on said spindle connected to said pin, and timed mechanism for sliding said collar to retract the pin, together with means for turning said pin to disengage its hook from the loop.

71. In a wire-working machine, a twister comprising a rotary spindle axially-bored for passage of the strand and having a twisting-head carrying a revolving twisting-device and a retractable hooked pin for engaging and drawing a portion of a transversely-placed wire into engagement by said twisting device, means for rotating said spindle, a slidable collar on said spindle connected to said pin, and timed mechanism for sliding said collar to retract the pin, said pin being capable of turning to disengage its hook from the loop and having a spring-pressed finger holding the hook in normal position, and a trippet adapted at proper periods to engage said finger to turn the pin.

72. In a wire-working machine, a twister comprising a rotary spindle axially-bored for passage of the strand and having a twisting-head carrying a revolving twisting-device and a retractable hooked-pin for engaging and drawing a portion of a transversely-placed wire into engagement by said twisting-device, means for rotating said spindle, a slidable collar on said spindle connected to said pin, and timed mechanism for sliding said collar to retract the pin, said pin being capable of turning to disengage its hook from the loop, and a trippet adapted at proper periods to engage an abutment on the pin to turn the same.

73. In a wire-working machine, the combination of an intermittently-rotating twister, a bevel pinion on its spindle, and a drive-wheel having an intermittent gear adapted to engage said pinion, a protruding and retracting pin carried by said twister, and means for reciprocating said pin actuated by said drive-wheel.

74. In a wire-working machine, the combination of an intermittently-rotating twister, a bevel pinion on its spindle, and a drive-wheel having an intermittent gear adapted to engage said pinion, a protruding and retracting pin carried by said twister, a slidable collar on the twister spindle connected to said pin, an actuating lever connected to said collar, and a cam on said drive-wheel for actuating said lever.

75. In a wire-working machine, the combination of a rotary twister axially-bored for passage of the strand and carrying a revolving twisting device and a protruding and retracting pin for engaging a portion of a cross-wire and drawing it into engagement by said twisting device, a slidable collar on the twister-spindle connected to said pin, a drive-wheel having at its side an intermittent gear adapted to engage a bevel-pinion on the twister-spindle, and means for actuating said slidable collar to protrude and retract the pin at proper periods.

76. In a wire-working machine, the combination of a rotary twister axially-bored for passage of the strand and carrying a revolving twisting device and a protruding and retracting pin for engaging a portion of a cross-wire and drawing it into engagement by said twisting device, a slidable collar on the twister spindle connected to said pin, a drive-wheel having at its side an intermittent gear adapted to engage a bevel-pinion on the twister-spindle, an actuating lever connected to said collar, and a cam on said drive-wheel for actuating said lever.

77. In a wire-working machine, the combination of a rotary twister axially-bored for passage of the strand and carrying a revolving twisting device and a protruding and retracting pin for engaging a portion of a cross-wire and drawing it into engagement by said twisting device, a slidable collar on the twister-spindle connected to said pin, a drive-wheel having an intermittent gear adapted to engage a bevel-pinion on the twister-spindle, and means for actuating said slidable collar to protrude and retract the pin at proper periods, the periphery of said drive-wheel being a cam, and a lever connected to said collar and actuated by said cam.

78. A wire-fabric making machine having, in combination, mechanism for feeding a series of strands, coacting feed-rollers for feeding a stay-feed-wire across the strands, mechanism for intermittently rotating said rollers, and mechanism for attaching the stay-feed-wire to the strands during the interval between such rotation of the rollers by drawing loops in the wire and twisting them around the strands, said feed-rollers permitting inward movements of the wire to supply the lengths for said loops.

79. In a wire-working machine, coacting feed-rollers for feeding a wire, intermeshing gears on the roller-shafts, one shaft being journaled in a movable bearing, mechanism for intermittently rotating the other shaft, and means for automatically moving the said movable bearing during such rotation to cause the rollers to tightly grip the wire.

80. In a wire-working machine, coacting feed-rollers for feeding a wire, intermeshing gears on the roller-shafts, one shaft journaled in a movable bearing, mechanism for intermittently rotating the other shaft, a spring acting between said movable bearing and an abutment, and means for automatically forcing said abutment inward to further compress the spring during the aforesaid rotation.

81. A wire-fabric making machine having, in combination, mechanism for feeding a series of strands, coacting feed-rollers for feeding a stay-feed-wire across the strands, mechanism for intermittently rotating said rollers, and mechanism for attaching the stay-feed-wire to the strands during the interval between such rotation of the rollers by drawing loops in the wire and twisting them around the strands, a movable bearing for one of said feed-rollers spring-pressed to hold the rollers yieldingly together, and means for automatically forcing the rollers tightly together to positively grip the stay-feed-wire during the feed.

82. In a wire-working machine, coacting feed-rollers for feeding a wire, intermeshing gears on the roller-shafts, one shaft being journaled in a movable bearing, mechanism for intermittently rotating the other shaft; and means for moving the said movable bearing during such rotation to cause the rollers to tightly grip the wire, and a drive-shaft connected by a clutch or ratchet to one of the roller-shafts.

83. In a wire-working machine, coacting feed-rollers for feeding a wire, intermeshing gears therefor, an intermittently-driven spindle, and a ratchet-device between said spindle and one of the roller-shafts causing the latter to rotate with said spindle and allowing rotation of the roller in the same direction but preventing reverse rotation.

84. In a wire fabricating machine, in combination, a rotatable spindle, a sleeve slidably mounted on said spindle, said sleeve carrying a pin, a cam wheel, and a lever engaging said cam wheel and said sleeve whereby said sleeve and pin are actuated by said cam wheel.

85. A wire fabric loom, including a series of combined loopers and twisters, a series of line-wire guides associated therewith, and means for simultaneously moving said guides toward and from the line wires.

86. A wire fabric loom, including a series of rotary twisters, reciprocatory wrapping pins associated with said twisters, a series of rotary cams, and means operated by the cams to move the pins relatively to the twisters.

87. A wire fabric loom, including a series of twisters each provided with a wrapping pin movable relatively thereto, pin-operating means including a cam shaft and a series of rotary cams mounted thereon, and driving means to insure the operation of the pins at the proper points in the movements of the twisters.

88. A wire fabric loom, including a series of twisters arranged to apply a stay to a series of line wires, and twister operating mechanism including a corresponding series of twister operating gears movable together and each arranged to come into operation during the operation of the preceding gear.

89. A wire fabric loom, including an alined series of rotary twisters, and operating means therefor including a series of twister pinions, a corresponding series of graduated twister-operating gears each arranged to engage a pinion, and a driving shaft whereby said gears are operated to bring the pinions into operation in succession by reason of the graduation of the gears.

90. A wire fabric loom, including a series of devices for twisting intermediate and end portions of a single stay about intermediate and marginal line wires, said devices being adapted to have said marginal line wires extend longitudinally thereof, and means having a path of movement transversely of the twisting devices and line wires for carrying a single stay laterally of itself and transversely of the line wires and twisting devices to present said stay to the twisters.

91. In a wire fabricating machine, in combination, a support, rotatable spindles journaled in bearings on said support and having wrapping heads, said wrapping heads having openings therethrough, a sleeve slidably mounted on each spindle, a pin carried by each sleeve and adapted to be projected through the opening in its wrapping head, a cam wheel for each spindle, and a lever for each spindle, each lever being pivoted to a suitable support and engaging a sleeve and its corresponding cam wheel, whereby said pins are actuated by said cam wheels, and means for rotating said spindles.

92. In a wire fabricating machine, in combination, a support, rotatable spindles journaled in bearings on said support and having wrapping heads, said wrapping heads having openings therethrough, sleeves slidably mounted on said spindles, a pin carried by each sleeve and adapted to be projected through the opening in its wrapping head, cam wheels one for each spindle, levers one for each spindle, said levers pivoted on a suitable support and engaging said sleeves and said cam wheels, whereby said pins are actuated by said cam wheels, and means for rotating said spindles.

93. In a wire fence machine, a series of progressively acting devices adapted to form loops in a stay wire placed across a series of line wires and to wrap said loops around the line wires, each of said devices except the first being brought into action after the next preceding device has started and before such preceding device has completed its wrap, and a device at one end of the series adapted to wrap the end of the stay wire around a marginal line wire after one or more of said loop forming and wrapping devices have been brought into action.

94. In a wire fence machine, a series of rotary devices arranged to operate in succession for connecting a stay to a series of line wires, means for feeding a stay length across the series of line wires before the connecting devices begin to operate, each device except the first being brought into action after a preceding device has started and before the latter has completed its connection, the device at one end of the series being adapted to wrap the end of the stay around a marginal wire and arranged to rotate in an opposite direction to a preceding device.

95. In a wire fabric loom, a series of devices for forming loops in a stay wire and wrapping said loops around a series of line wires, means for placing a wire across said series of line wires, means for severing a stay length from the wire so placed, and means for actuating said devices in succession, each device except the first to act coming into action during the operation of another device, the device at one end of the series being adapted to wrap the end of the stay around a marginal line wire.

96. In a wire fabric loom, a series of wire connecting devices arranged to connect a stay to a series of line wires, means for placing a stay wire across said series of line wires before the connecting devices begin to operate, means for severing a stay length from the wires so placed, and means for actuating said devices in succession, each device except the first to act being brought into action during the operation of another device, the device at one end of the series arranged to rotate in an opposite direction to a preceding device.

97. In a wire-fabric weaving mechanism, a series of twisters, means for feeding a stay feed-wire across a series of strands threaded through said twisters, and a cutter for severing the stay from said feed-wire, the intermediate twisters being adapted to form loops in the feed-wire and twist said loops around the respective intermediate strands, and the marginal twisters being adapted to twist the ends of the stay around the marginal strands, means for operating in progression the twisters which form the loops, and means for operating the cutter after the loops have been formed.

98. In a wire-fabric weaving mechanism, a series of twisters, means for feeding a stay feed-wire across a series of strands threaded through said twisters, and a cutter for severing the stay from said feed-wire, the intermediate twisters being adapted to form loops in the feed-wire and twist said loops around the respective intermediate strands, and the marginal twisters being adapted to twist the ends of the stay around the marginal strands, means for operating in progression the twisters which form the loops, and means for operating the cutter after the loops have been formed, the twister adjacent to the cutter operating to twist the adjacent end of the stay after the cutter has operated.

99. In a wire-fabric weaving mechanism, a series of twisters, means for feeding a stay feed-wire across a series of strands threaded through said twisters, and a cutter for severing the stay from said feed-wire, the intermediate twisters adapted to form loops in the feed-wire and twist said loops around the respective intermediate strands, while the marginal twisters are adapted to twist the ends of the stay around the marginal strands, means for operating in progression the twisters which form the loops, and means for operating said cutter after the loops have been formed, the twister adjacent to the cutter adapted to twist the adjacent end of the stay after the cutter has operated.

In testimony whereof we affix our signatures, in presence of two witnesses.

PETTIS A. REID.
WALTER V. REID.
JAMES KELLEY.

Witnesses:
JOHN A. ZIMMERMAN,
EVERETT R. LEMON.

Copies of this patent may be obtained for five cents each, by addressing the "Commissioner of Patents, Washington, D. C."

It is hereby certified that in Letters Patent No. 1,160,089, granted November 9, 1915, upon the application of Pettis A. Reid, Walter V. Reid, and James Kelley, of Richmond, Indiana, for an improvement in "Wire-Fence Machines," errors appear in the printed specification requiring correction as follows: Page 8, lines 9-10, for the compound word "looping-pen" read *looping-pin;* same page, line 23, for the word "through" read *though;* page 14, line 32, claim 43, strike out the words "during its feed, said tubular guides adapted" and insert the words *and devices for lifting the stay-wire from;* page 18, line 72, claim 97, for the word "serving" read *severing;* and that the said Letters Patent should be read with these corrections therein that the same may conform to the record of the case in the Patent Office.

Signed and sealed this 16th day of November, A. D., 1915.

[SEAL.]                J. T. NEWTON,
*Acting Commissioner of Patents.*